Aug. 9, 1949.  C. R. FORDYCE ET AL  2,478,383
MANUFACTURE OF CELLULOSE ESTERS
Filed March 26, 1946
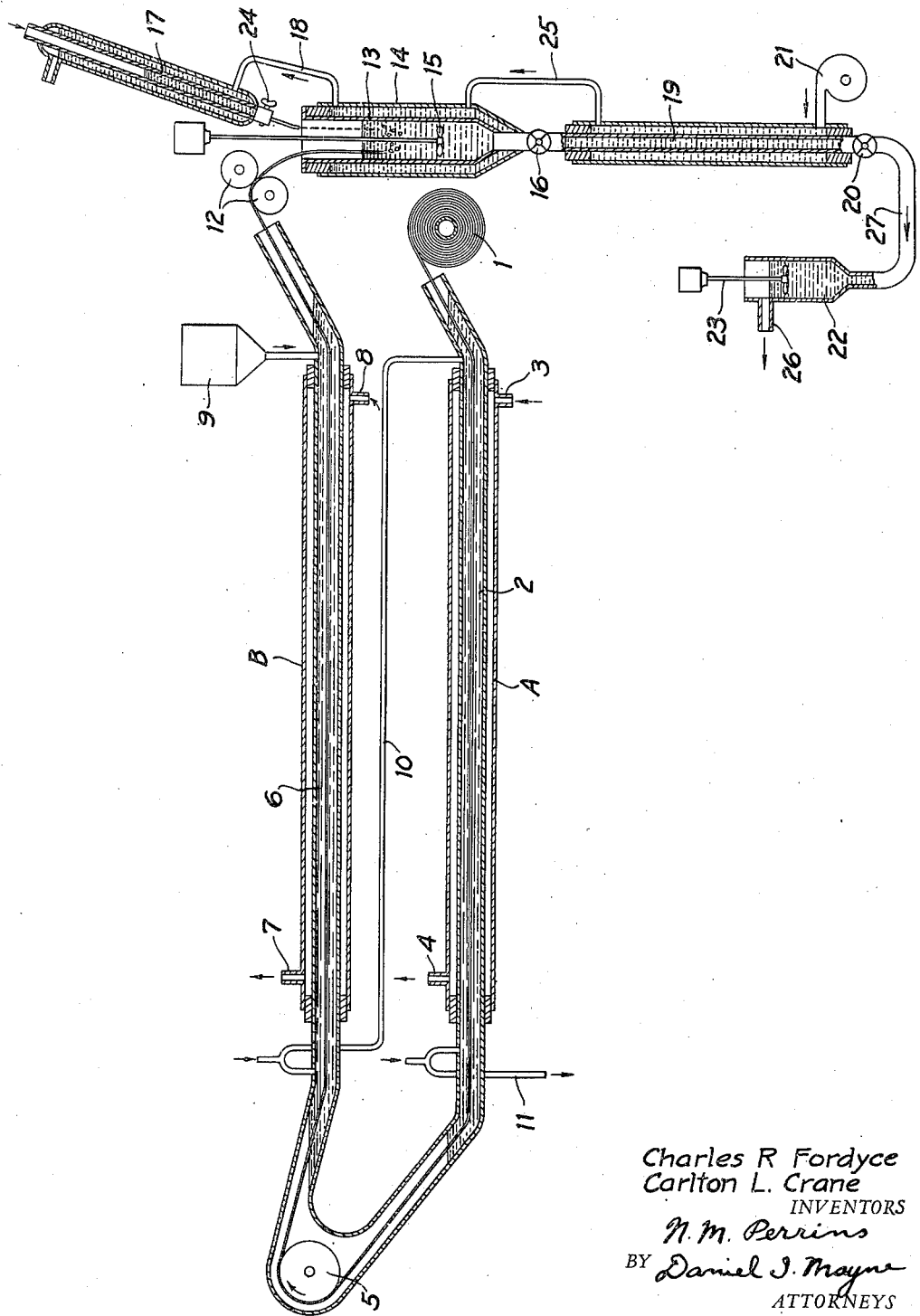
Charles R Fordyce
Carlton L. Crane
INVENTORS
BY
ATTORNEYS Patented Aug. 9, 1949

2,478,383

UNITED STATES PATENT OFFICE 2,478,383

MANUFACTURE OF CELLULOSE ESTERS

Charles R. Fordyce and Carlton L. Crane, Rochester, N. Y., assignors to Eastman Kodak Company, Rochester, N. Y., a corporation of New Jersey Application March 26, 1946, Serial No. 657,223

2 Claims. (Cl. 260—227)

This invention relates to a continuous process for the manufacture of organic acid esters of cellulose, particularly cellulose acetate.

Standard processes for the manufacture of cellulose acetate are of the batch type and usually employ esterification procedures carried out over a period of several hours. The esterification reaction is normally started at room temperature and reaches a temperature of 100–130° F. In the early stages of acetylation the cellulose is suspended as a fibrous material in the liquid reaction medium. During the intermediate stage the partially dissolved cellulose forms a heavy dough which is semi-fluid. Following this, the acetylated cellulose dissolves to form a viscous solution which can be handled as a homogeneous liquid. A mild esterification reaction carried through these stages of processing has been necessary to insure high viscosity products of good quality.

Continuous acetylation procedures have previously been proposed but have been based on mechanical conditions to carry out the process along the lines of a slow esterification reaction passing through the phases outlined above. The intermediate physical condition of the reaction mass greatly complicates handling the esterification process in a continuous manner and has, therefore, limited the success of these processes.

We have found that in accordance with our invention high viscosity cellulose acetate may be manufactured by continuous acetylation. This is accomplished by the use of temperatures of at least 120° F. in the initial acetylation, followed by equal or a continually lowering reaction temperature. This is made possible by a thorough activation of the cellulose prior to the esterification proper. The entire esterification period of the cellulose is extremely short and is ordinarily within the range of 15–30 minutes in accordance with our invention.

By the use of a thorough activation accomplished in a short time, removal of substantially all of the moisture from the cellulose and a high initial reaction temperature, we have been able to avoid mechanical handling difficulties because the cellulose immediately disperses to a viscous solution in the first stage of the reaction and at the same time is prevented from severe degradation or loss of viscosity by a short time of reaction. The reaction solution is continually removed from the esterification zone at the same rate as the cellulose and esterification liquid are added thereto. Upon leaving the acetylation zone, the reaction solution is carried through a zone of equal or lower temperature at a temperature and for a time controlled to produce the desired viscosity. Following this the dope is mixed with aqueous acetic acid and hydrolyzation is allowed to proceed in the normal manner.

One object of our invention is to provide a continuous dope method for the esterification of cellulose. Another object of our invention is to provide a method for preparing cellulose esters in which the esterification is rapidly carried out. A further object of our invention is to provide a method for esterifying the cellulose to obtain a cellulose ester dope having a minimum amount of fiber when inspected under polarized light.

In its broadest aspects, our invention is carried out by running cellulose in sheet or strip form through a pretreatment embodying at least two sections, in the earlier section of which the cellulose is subjected to the swelling action of water, usually in the form of aqueous acid at an elevated temperature and in a later section the so-swelled cellulose is treated with anhydrous acid, such as glacial acetic acid at a somewhat lower temperature to condition the swelled cellulose so as to ready it for the esterification proper. After the cellulose has been pretreated it is passed into a reaction chamber in which the liquid-to-cellulose ratio is maintained at at least 8 to 1, the chamber being heated but the time of treatment being short so that the cellulose is quickly acetylated and thus degradation and breakdown of the cellulose is substantially avoided. A dope is thereby formed, and this dope is passed through a further section having an elevated temperature to assure completeness of the esterification and to obtain the desired viscosity of the cellulose ester.

This invention may be more clearly described by referring to the accompanying drawings illustrating an apparatus which has been found to be eminently suitable for use in esterifying cellulose in accordance with our invention. This apparatus consists of two jacketed longitudinal pretreatment sections 2 and 6, the temperature of which may be controlled by letting in temperature-regulating means through inlets 3 and 8, and withdrawing through outlets 4 and 7. The cellulose sheet is led from pulp roll 1 through one of the sections 2, and over roll 5 into the other of these sections 6. Pretreatment section 6 is supplied with anhydrous acid from supply tank 9, which acid passes countercurrent to the cellulose strip through the pretreatment section 6, and then through overflow pipe 10 to pretreatment section 2 where the acid moves in the same direction as the pulp strip. The spent acid is then withdrawn through overflow 11. After the pulp strip is pretreated, it is fed by rolls 12, into the esterification chamber 13, which is provided with a stirrer 15, and jacket 14. The acetylation liquid is fed into this chamber from the jacketed supply chamber 17, the flow of the esterification liquid being regulated by valve 24. The esterification liquid is warmed by means of the spent warming liquid from the jacket of the esterification chamber, which liquid is passed into the jacket of the acetylation mixer section 17, by means of conduit 18. The acetylated cellulose dope is drawn off from the chamber through valve 16, into section 19 in which the dope is subjected to elevated temperature without agitation so as to assure clarity and the proper viscosity. This section 19 is jacketed, the temperature of which is controlled by pumping hot water with pump 21 into the jacket and letting the hot water therefrom through conduit 25 into the jacket surrounding the acetylation chamber. The withdrawal of dope from the section 19 is regulated by means of valve 20 and is passed through conduit 27 into a mixing chamber 22, in which it is stirred by means of stirrer 23 with aqueous acetic acid so as to get the dope in a form that hydrolysis may occur. The so-mixed dope is allowed to exit through overflow 26 into a jacketed pipe maintained at a constant temperature. Samples of the dope are tested at intervals and when the cellulose ester is hydrolyzed to the desired acyl content, it is precipitated continuously.

The cellulose which is employed in a continuous esterification process in accordance with our invention is acetylation grade cellulose, such as high alpha-cellulose wood pulp or refined cotton linters. The cellulose should be in strip form, and the width of the strip should be governed by the apparatus used. It is preferable that there be a thickness within the range of .046–.09 inch to obtain adequate pretreatment within the time which it is desirable to allow for this purpose. Obviously, a greater thickness can be used but in that case adjustments have to be made which complicate the process. With the process as described herein cellulose sheeting below .09 inch thickness will activate satisfactorily. For instance, ordinary pulp sheet as purchased on the market is of a thickness and density quite suitable for the operation of this process.

The sheet cellulose employed may be that ordinarily obtained on the open market, and has a density of no more than 48 pounds per cubic foot, providing the moisture content is not more than 10%. If the pulp sheet has excessive density, the penetration of the acid therein is lessened and, therefore, it is preferable that the sheeted cellulose have a density of not more than 48 pounds per cubic foot. Obviously, the cellulose sheet used should be one which is adapted for acetylation, that is, having no sizing or liquid-resistant material embodied therein.

The pretreatment in accordance with our invention is carried out with the use of two sections. The cellulose strip is led into a pretreating section, A, as represented by 2 in the drawing in which it is treated with a liquid containing water. Preferably, the pretreating liquid used in this section is 90–98% acid, such as acetic, but it is to be understood that more dilute acids or even water could be employed. With the use, however, of 90–98% strength acid the operation of this section may be very readily tied in with the operation of the second section of the pretreatment as shown in the drawing. This section A is maintained at an elevated temperature, such as within the range of 100–210° F. and preferably at a temperature of at least 150° F. After the cellulose has been swollen by treatment in section A, it may then be passed into section B in which the cellulose strip is contacted with anhydrous acid, such as acetic, at a temperature considerably lower than that employed in section A. If glacial acetic acid is employed in section B, the temperature may desirably be 65–100° F. to avoid solidification of the acetic acid. The temperature in section A should be at least 30° F., and preferably at least 70° F., higher than in section B. It is also desirable in operating this pretreatment method to keep the cellulose strip under enclosed conditions after it has been wetted to prevent its picking up moisture or else to provide more treatment in section B with anhydrous acid than would otherwise be necessary. Also, the amount of treatment in section B will be governed by the water content imparted to the cellulose strip from the treatment in section A. Exposure to the air, is therefore exceptionally bad as the humidity of the air varies from day to day so that compensation for the moisture of the air is rather uncertain unless adjustment is made therefor in accordance with that variation.

A typical pretreatment in accordance with our invention is to provide pretreatment sections the bath portion of which is 3¼ feet for each section through which a three-eighth inch strip of cellulose is passed at the rate of one-third foot per minute. In section A a temperature of 210° F. and an acid concentration of 97% may be employed, whereas in B the temperature may be 100° F. and the acid therein glacial acetic (99.7%). Under these conditions the acid may be run through sections B and A at a rate of 700 cc. per hour. If the cellulose strip is passed through at a faster rate, it is desirable to compensate therefor by the use of longer sections or some increase in the rate at which the acid is passed through or both. By this means a good activation will be imparted to the cellulose.

After the cellulose is pretreated, it is led into the esterification chamber into which esterification liquid consisting of anhydride and catalyst are also being fed. The ratio of esterification liquid to cellulose in this chamber should be at least 8 to 1, and we have found that a ratio of 9.4 to 1 is quite satisfactory for operation. The cellulose being fed into the esterification chamber contains therein approximately three parts of acid to one of cellulose and, therefore, for operation at a ratio of 9.4 to 1 liquid to cellulose, it would be necessary to introduce 6.4 parts of anhydride and catalyst into the esterification chamber for every part of pulp being introduced therein. The process can be operated at a higher ratio of liquid to cellulose but a ratio of more than 9.4 to 1 is not necessary. This esterification chamber is maintained at an elevated temperature and is preferably within the range of 120–150° F. depending on the length of the chamber. It is desirable that the cellulose introduced into the chamber be substantially free of moisture, as otherwise anhydride would be consumed thereby which would somewhat interfere with the continued operation of the process. We have found that if cellulose containing excess moisture is continually introduced, gelling and lack of clarity increase with the continued operation of the process. If sulfuric acid is employed as the catalyst with the acetic anhydride, it should be employed in a proportion such that it is 2–5% of the bone-dry weight of the cellulose. In the acetylation liquid added it need constitute only 0.5–1% of the liquid mixture.

After the cellulose has lost its identity upon stirring into the acetylation liquid, it may then be passed into a non-agitated chamber, maintained at a temperature near to that of the acetylation chamber, where the completeness of the esterification is assured and the desired viscosity is obtained. If a high viscosity material is desired, this chamber may be short, whereas if the viscosity is to be lowered somewhat, a longer time of treatment is desirable. After this conditioning treatment the dope is mixed with water, such as by employing aqueous acetic acid for this purpose and hydrolyzed, continuously such as by passing it through the jacketed pipe at 100–120° F. for the time desired to give the acyl content wanted, and then continuously precipitating the ester into a suitable bath. Instead of making the finishing section shorter, in the making of high viscosity esters, this section may be maintained at a lower temperature than employed in the esterification. The temperature in this section may be anywhere from 100–150° F. If the cellulose sheet which enters the acetylation chamber is not completely anhydrous, this may be compensated for to some extent by extending the length of the finishing section of the acetylation apparatus. Ordinarily in carrying out the esterification of cellulose in accordance with our invention, the time consumed from the time the cellulose strip enters the pretreatment liquid until it is withdrawn from the finishing section comprises 15 to 30 minutes. As, however, this process is continuous in operation this time is representative of the average time consumption in the process.

Although our process has been described primarily with reference to the manufacture of cellulose acetate in which acetic acid is employed in the pretreatment and acetic anhydride is employed in the esterification, our esterification method is also useful for the manufacture of propionic and butyric acid esters of cellulose. For example, in the pretreatment operations acetic acid may be employed whereas for the esterification propionic or butyric anhydride may be used. Also, in the pretreatment method propionic or butyric acid may be employed although acetic acid is more effective as a pretreating agent than propionic or butyric acid and, therefore, this must be compensated for either by employment of longer sections in the pretreatment operation or the use of pretreatment liquid in section A having a higher water content, such as taught in U. S. Patent No. 2,113,301 of Gardner.

The following example illustrates the preparation of cellulose esters in accordance with our invention. The apparatus illustrated by the drawing was employed in carrying out this example.

A 50-foot strip of high α-cellulose acetylation grade pulp having a width of 5/16 of an inch and a thickness of .046–.049 inch was passed through a bath of acetic acid of 99½% strength at a temperature of 210° F. at the rate of 0.333 ft. per minute, this section being 3¼ feet long. This sheet was then run through a second longitudinal section having a length of 3¼ feet, the concentration of acetic acid here being 99.8% and the temperature being maintained at 100° F., the rate of passage of the cellulose strip remaining the same. The cellulose strip which had absorbed three parts of acid per part of pulp was passed into an acetylation chamber equipped with a stirrer and maintained at a temperature of 130° F. Acetylation mixture, also at a temperature of 130° F., made up in the ratio of 180 g. of acetic anhydride (97%), 120 g. of acetic acid and 0.5 cc. of sulfuric acid (95%), was passed into the acetylation chamber at the rate of 6.4 g. of acetylation mixture per gram of dry pulp. The material was in the acetylator 15–30 minutes and then was allowed to flow through a non-agitated section maintained at a temperature of 130° F. The dope was drawn off from this second section at such a rate that a level was maintained in the acetylating chamber to assure uniform mixing therein. To each 400 g. of acetylation dope drawn off was added 80 g. of 66⅔% aqueous acetic acid. The mass was moved along while at 100° F. at such a rate that a product was obtained having an acetyl content of 37.9%, a first-stage viscosity of 35 seconds, and a viscosity in 10% acetone of 167 c. p. s. Polarized light showed that the dope contained substantially no fiber.

We claim:

1. A method for the continuous esterification of cellulose which comprises continuously passing cellulose sheet of .046–.09 inch thickness and low density through a 2-section pretreatment, in which lower fatty acid is flowed through the sections in reverse order to that which the cellulose takes, whereby anhydrous liquid lower fatty acid is flowed through the second section to remove water from the cellulose sheet passing therethrough, which acid when spent and having a water content of 2–10% resulting from its use in the treatment of the cellulose sheet in the second section is flowed through the first section thereby swelling to a high degree the cellulose sheet passing therethrough, the temperature of the first section being maintained at 100–212° F. and that of the second section at least 30° F. lower, continuously passing the so-pretreated sheet into an acylation chamber, into which is introduced an acylating liquid, at a rate that the liquid-to-cellulose ratio is maintained at, at least, 8 to 1, the chamber temperature being maintained at 120–150° F. and the average time of passage therethrough being within the range of 15–30 minutes whereby the cellulose is acylated and dissolved and withdrawing the resulting mass therefrom through a second chamber maintained at a temperature of 100–150° F. to impart the desired viscosity to the cellulose ester formed.

2. A method for the continuous esterification of cellulose which comprises continuously passing cellulose sheet of .046–.09 inch thickness and low density through a 2-section pretreatment, in which acetic acid is flowed through the sections in reverse order to that which the cellulose takes, whereby anhydrous liquid acetic acid is flowed through the second section to remove water from the cellulose sheet passing therethrough, which acid when spent and having a water content of 2–10% resulting from its use in the treatment of the cellulose sheet in the second section is flowed through the first section thereby swelling to a high degree the cellulose sheet passing therethrough, the temperature of the first section being maintained at 100–212° F. and that of the second section at least 30° F. lower, continuously passing the so-pretreated sheet into an acylation chamber, into which is introduced an acylating liquid, at a rate that the liquid-to-cellulose ratio is maintained at, at least, 8 to 1, the chamber temperature being maintained at 120–150° F. and the average time of passage therethrough being within the range of 15–30 minutes whereby the cellulose is acylated and dissolved and withdrawing the resulting mass therefrom through a second chamber maintained at a temperature of 100–150° F. to impart the desired viscosity to the cellulose ester formed.

CHARLES R. FORDYCE.
CARLTON L. CRANE.

REFERENCES CITED

The following references are of record in the file of this patent:

UNITED STATES PATENTS

| Number | Name | Date |
|---|---|---|
| 1,916,274 | Martin | July 4, 1933 |
| 1,918,251 | Dreyfus | July 18, 1933 |
| 2,000,602 | Malm | May 7, 1935 |
| 2,036,947 | McKee | Apr. 7, 1936 |
| 2,140,639 | Malm | Dec. 20, 1938 |
| 2,143,785 | Malm | Jan. 10, 1939 |
| 2,315,973 | Malm | Apr. 6, 1943 |